UNITED STATES PATENT OFFICE.

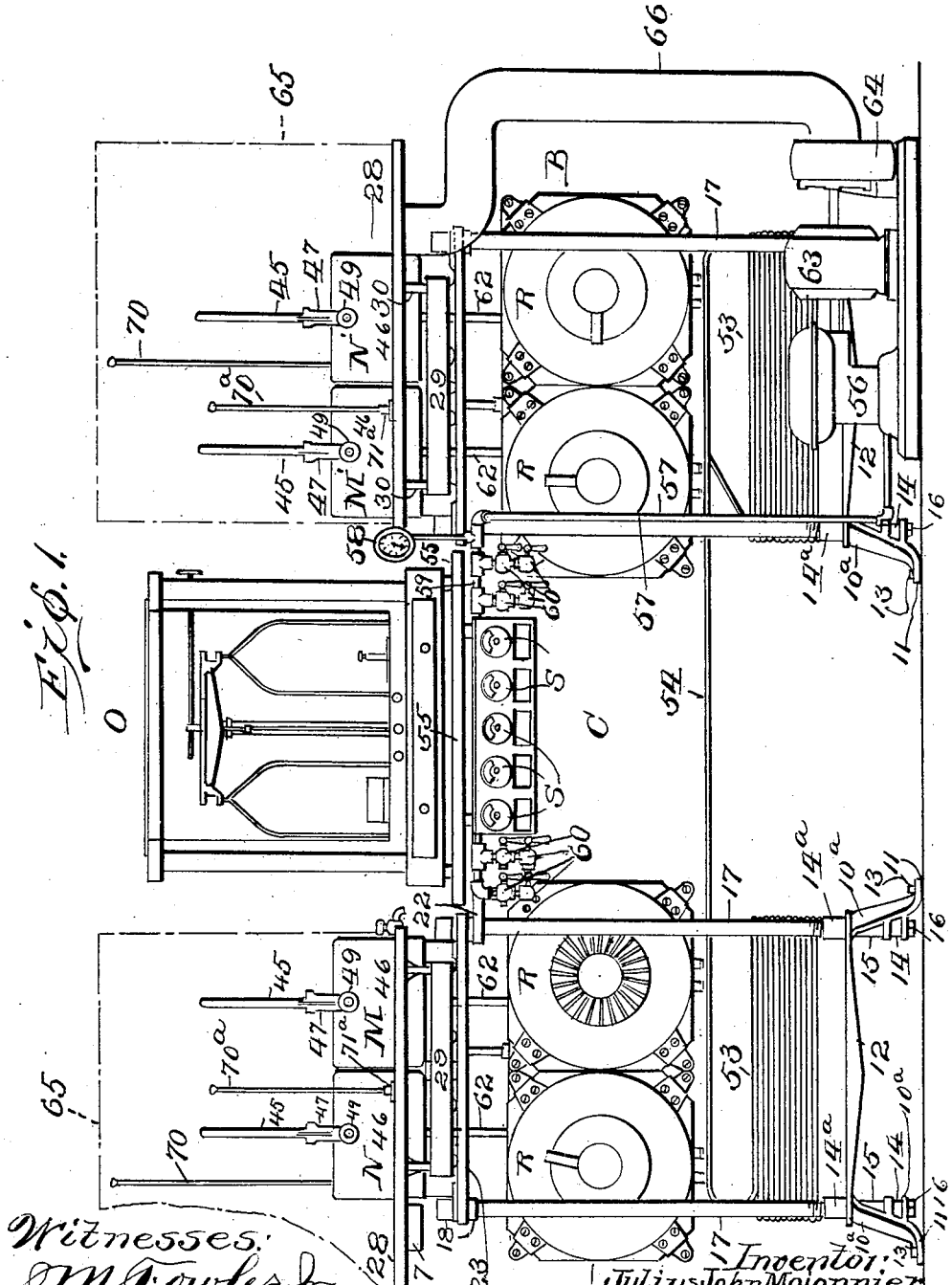

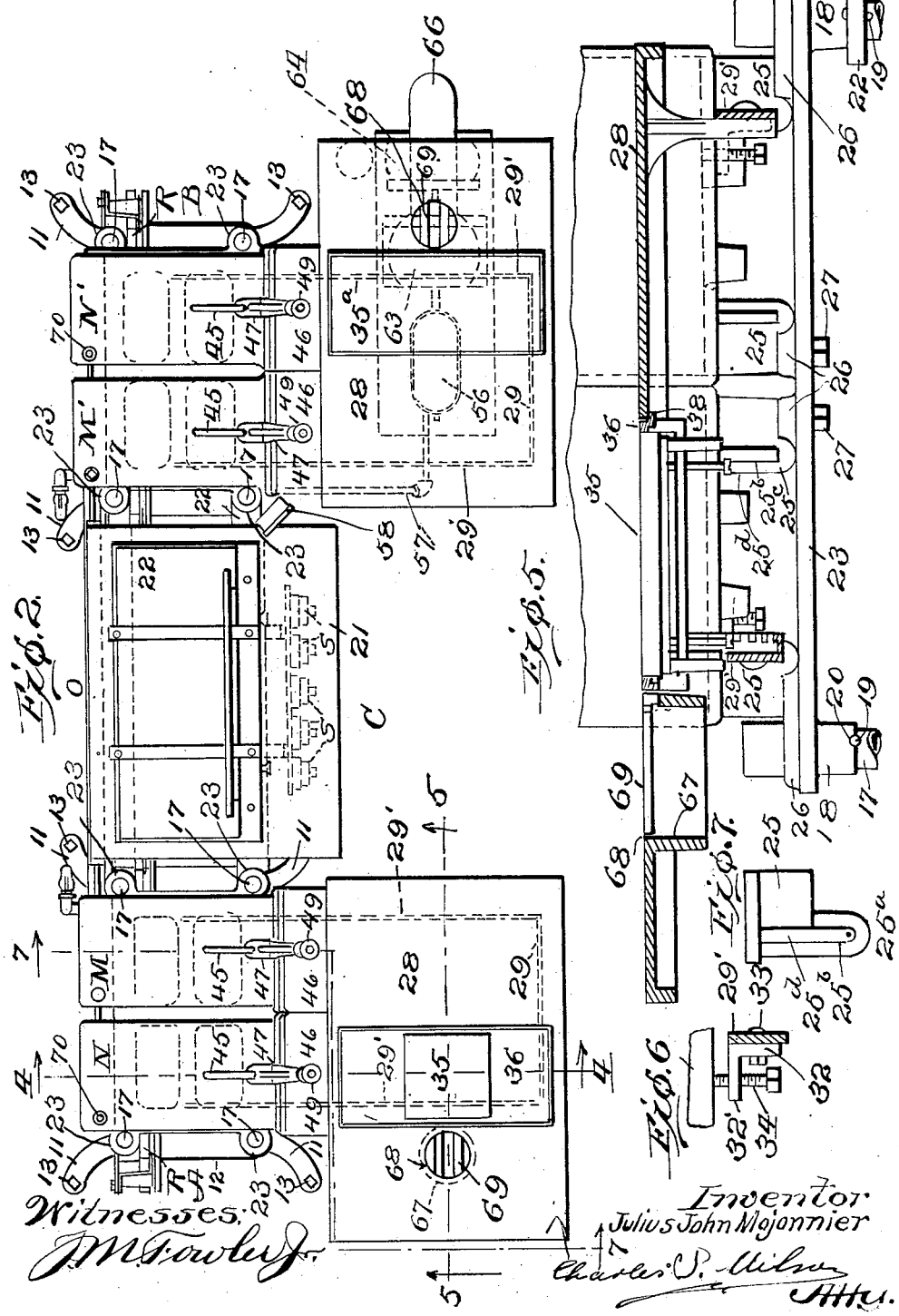

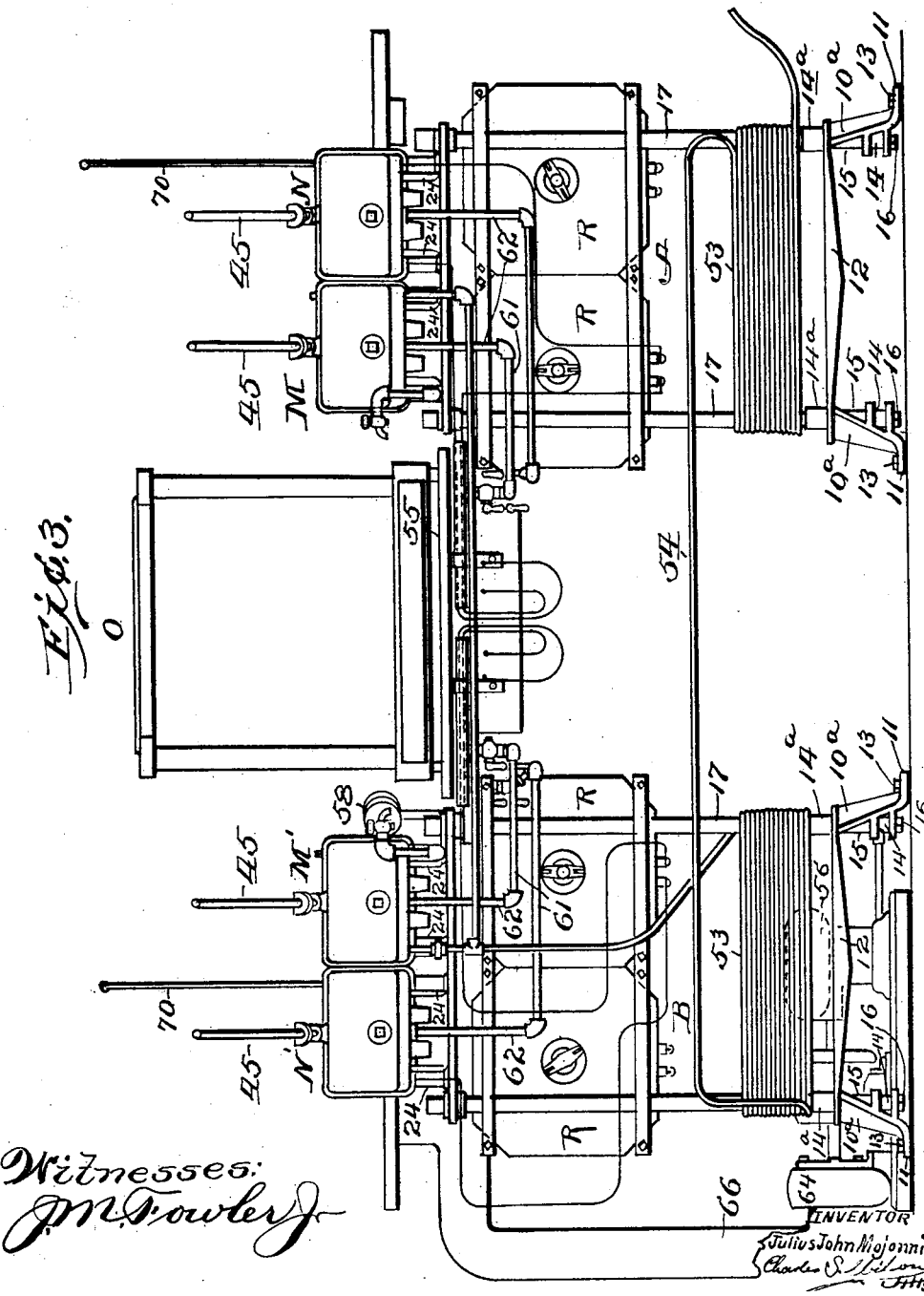

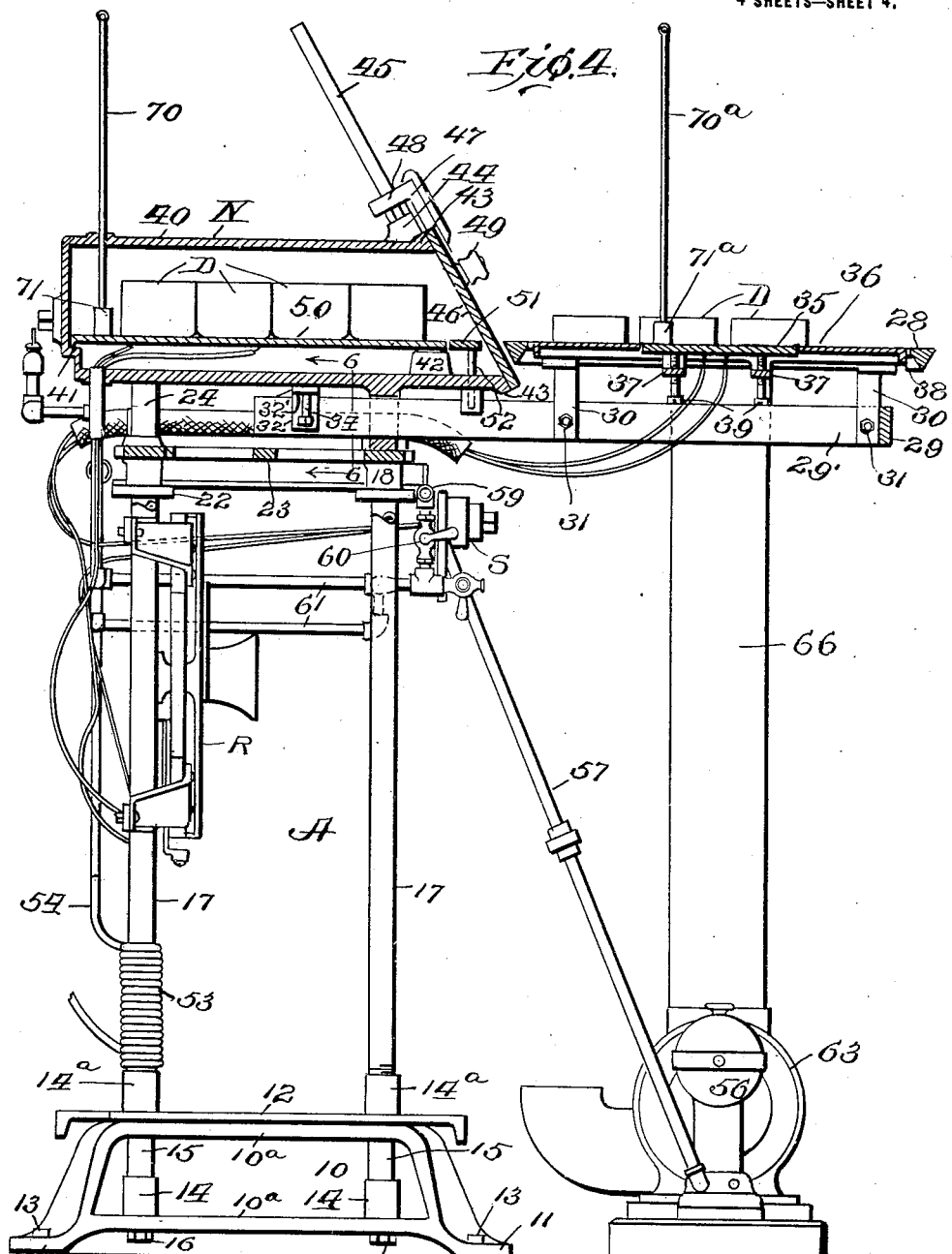

JULIUS JOHN MOJONNIER, OF OAK PARK, ILLINOIS, ASSIGNOR TO MOJONNIER BROS. CO., OF PORTLAND, MAINE, A CORPORATION OF MAINE.

LABORATORY APPARATUS.

1,372,243.   Specification of Letters Patent.   Patented Mar. 22, 1921.

Application filed April 15, 1916, Serial No. 91,405. Renewed July 7, 1920. Serial No. 394,471.

*To all whom it may concern:*

Be it known that I, JULIUS J. MOJONNIER, a citizen of the United States, residing at Oak Park, in the county of Cook and State of Illinois, have invented certain new and useful Improvements in Laboratory Apparatus, of which the following is a specification.

This invention relates to new and useful improvements in laboratory apparatus of the character especially designed for carrying out and completing tests in liquid food products, such as the determination of total solids of milk and dairy products, and butter fat in milk or milk products, etc.

It is the object of the present invention to provide for the convenient and efficient handling of a multiplicity or plurality of tests simultaneously, so arranging the different elements of the apparatus that the surrounding conditions will be substantially the same and constant as to each element, with reference to temperature, vibrations and other conditions which, if varied, would effect the accuracy of the tests.

With the above and other objects in view, as will be apparent, this invention consists in the construction, combination and arrangement of parts, all as hereinafter more fully described, claimed and illustrated in the accompanying drawings, wherein:—

Figure 1 is a front elevation of an apparatus constructed in accordance with the present invention.

Fig. 2 is a plan view thereof.

Fig. 3 is a rear elevation.

Fig. 4 is a vertical section taken along line 4—4 of Fig. 2, to show the interior construction of one of the heating ovens.

Fig. 5 is a section along line 5—5 of Fig. 2, and illustrates the construction and arrangement of the platform or table located in front of the ovens, and Fig. 6 is a fragmentary section along the line of 6—6 of Fig. 4 to illustrate the adjustment whereby the level of the tables or platforms are adjusted, and Fig. 7 is an elevation of one of the table supporting brackets.

In carrying out the present invention a frame is provided which is divided into three sections, to wit, one center section and two end sections. This frame is provided with various adjustments whereby the level thereof may be regulated in order that constant conditions with relation to vibrations, etc., may be maintained. Each end section of the frame carries an adjustable and removable platform extending horizontally from the front thereof, while the section itself supports a cooling chamber and a heating or drying oven. The cooling chambers of each end section of the frame are located adjacent to the central or medial section thereof in order that the temperature conditions created within or surrounding the cooling chambers may, as nearly as possible, approximate the temperature of the atmosphere surrounding said central or medial section. A chemical balance is mounted on the central or medial section of the frame and is therefore located between the end sections thereof, and naturally is subjected to the same general conditions as the apparatus carried by the end sections.

The apparatus is designed particularly for carrying out two tests, viz., a test for determining the total solids of liquids or liquid food products, hereinafter known as a "total solids test", and a test for determining the percentage of butter fat contained in milk or milk products, hereinafter known as a "fat test." For a proper understanding of the present apparatus, it is essential that these tests be briefly described by merely enumerating the steps involved therein.

The "total solids test" consists in first weighing a circular shallow dish of a comparatively large diameter; second, placing a sample of the liquid in said dish so that the liquid merely covers the bottom of the dish in a thin film, and weighing the dish and liquid; third, subjecting the dish and its contents to a temperature of 180 to 190 degrees centigrade, thereby briskly boiling the film of liquid and causing the surface thereof to break or bubble; and as a result drive off the moisture in the liquid leaving a residue representing the solids in the liquid; fourth, subjecting the residue to a drying heat to finally and thoroughly remove all moisture which may be therein; fifth, cooling the residue to the temperature of the atmosphere surrounding the chemical balance; sixth, weighing the dish and the residue and finally comparing the weight of the residue with the weight of the sample, thus giving the percentage of total solids in the liquid.

The "fat test" consists in first mixing a known quantity of a milk product with certain chemicals which extract the fat in solution from the milk product: second, withdrawing the fat in solution, at the same time rapidly evaporating the solvent therefrom, leaving a residue which constitutes the fat originally in the milk product: third, subjecting the residue thus obtained to the action of a drying heat: fourth, cooling the residue so heated to the temperature of the atmosphere surrounding the balance: fifth, determining the quantity of fat thus obtained and comparing this quantity with the original quantity of the milk product.

Inasmuch as speed as well as accuracy forms an important part of the commercial success of the tests briefly described, it is essential that the apparatus used in carrying out these tests be a time saver in that all of the steps may be carried out by the same apparatus and as efficiently and quickly as possible.

Reference being had more particularly to the drawings, A designates one end section of the frame and B the remaining end section, while C designates generally the medial portion of the frame which carries the chemical balance O above referred to, and which is located between the end sections A and B of the frame. Each end section comprises a base frame 10 composed of the spaced horizontal bars 10ª, which converge one toward the other to form the feet 11, which are located below the plane of the lower horizontal bar 10ª. Two of these base frames 10 constitute the supports for each of the end frame sections A or B, and are secured together by rectangular frame 12, which rests upon the upper bars 10ª of each base frame 10. The feet 11 are pierced by the set-screws 13, whereby the position of the feet with respect to the floor may be regulated to determine the level of the entire apparatus in order that the same may be adjusted to eliminate undue unnecessary vibrations.

Sockets 14 pierce and are secured to the lower horizontal bar 10ª of each frame 10 and receive the vertical frame sections 15 which extend to and through the frame 12, and the upper horizontal bar 10ª, where they enter and are secured by the unions 14ª superposed above the frame 12. The sockets 14 are held by the bolts 16, which pass through the horizontal bar 10ª and provide for the adjustment of the sockets relative to said bars, when desired. From this description it becomes apparent that the base frame comprises a unitary structure capable of all needed adjustments to accommodate the apparatus to the contour of the supporting structure; each base frame for each end section A or B comprising two frames 10 connected to each other by the horizontal rectangular frame 12, the frames 10 each carrying two sockets 14, two vertical frame pieces 15 and two unions 14ª.
The unions 14ª of each base frame just described have threaded thereinto uprights 17 which, in combination, constitute the supporting structure of the end section upon which the apparatus directly rests, four uprights being provided for each end section A and B. At their upper ends the uprights 17 terminate in the collars 18, which rest upon pins 19, transversely arranged in the uprights to support said collar, each collar having depressions 20 for the reception of the projecting ends of the pins 19. The outer uprights 17 have the collars 18 resting directly upon the pins 19, while the table 21 of the medial or central section C of the apparatus is provided with the extensions 22, which rest directly upon the pins 19 of the inner uprights 17, the collars of said inner uprights being superposed above the coöperating extensions 22 of the table 21 and rest upon said extensions. In other words, the arrangement is such that the outer uprights 17 of each end section A or B support only the apparatus carried by their particular section; while the inner uprights 17 of each section A or B support not only the apparatus of their particular section, but also one end of the table 21 of the medial or central section C, said table being provided with the projections 22, which are pierced by openings for the reception of the uprights 17 and which rest directly upon the pins 19. The collars 18 carry a support or table 23, which is of a somewhat skeleton formation and which may, if desired, be formed integral with the said collars. The table 23 of the end section A supports and carries a cooling chamber M and a heating or drying oven N, while the table 23 of the other end section B carries and supports a similar cooling chamber M′ and a drying or heating oven N′. Along the rear edge of the table 23 are a plurality of vertical brackets 24, which support the ovens aforesaid, there being two brackets 24 for the drying or heating ovens N N′, and two brackets 24 for the cooling chamber M M′, said brackets being spaced sufficiently to support the rear ends of the coöperating chamber M and oven N throughout the width thereof, so that the same may be held against movement. The end brackets 24 may, if desired, be secured to the upper terminals of the adjoining uprights 17, as illustrated in Fig. 3. As an alternate construction, the brackets may be constructed in one section of material and be secured at their ends to the uprights 17; otherwise they are attached directly to the table 23. The forward ends of the ovens M and N are supported by the brackets 25 secured to the forward edge of the table 23. These brackets 25 (Fig. 7) constitute a body 25ª, which rests upon the bushings 26 on the table 23, and is secured thereto by the bolts 27 piercing the table 23, the bushing 26, and 1 body 25ª. A guide 25ᵇ is formed on one side of the body 25ª and extends below the lower terminal of said body as at 25ᶜ, so that the guide 25ᵇ rests directly upon the table 23, while the body 25ª rests upon the bushing 26. These brackets are secured to the chamber and oven M and N in any suitable manner, or may be formed integral therewith as desired, either construction being practical and efficient. Each bracket 25 is alined with a bracket 24 along the rear edge of the table 23, and therefore the chamber and oven M and N are supported at their four corners, thus holding the same solid and substantial upon the table 23.

A platform or table 28 coöperates with each pair of ovens and chambers M N and M' N', and is supported directly in front thereof in the same horizontal plane as the bottoms of the ovens aforesaid. This table is supported upon a U-shaped frame or bracket 29, having the arms 29' extending at right angles to the base thereof. These arms 29' are designed to be received and reciprocate in the guide openings 25ᵈ of the extreme end brackets 25, the medial or central brackets being located between the arms 29', as clearly shown in Fig. 5. The medial or central brackets 25 have the guides 25ᵈ provided in the event that it should be desired or necessary to use a narrower frame or bracket 29, i. e., one with its arms 29' closer together. In this case the arms 29' are received in one of the end brackets 25, and the next adjacent central bracket 25, or the other of the end brackets 25 and the next adjacent central bracket 25, as the case may be. The arms 29' of the U-frame 29 extend rearwardly over the table 23 and under the elements M and N carried thereby, after passing through the guide openings 25ᵈ of the brackets 25.

It is therefore manifest that the frame or bracket 29 is adjustable to and from the table 23 and the chamber and oven M and N, and may be positioned as necessitated by conditions. Vertical studs 30 are secured to the arms 29' of the frame or bracket 29 by means of the bolts 31, and at their upper ends carry the table 28 which is secured rigidly thereto, the details of which will be hereinafter described.

In order to regulate the level of the table 28 and to further aid in holding the frame or bracket 29 from movement, the rear terminals of the arms 29' of the frame or bracket 29 have the angle irons 32 rigidly secured thereto by means of the bolts 33, so that the arms 32' of the angle irons extend in a plane at right angles to the upper edges of the coöperating arms 29'. A vertical set screw 34 is threaded into the horizontal arm 32' of the angle iron 32, and rests against the bottom of the adjacent oven. An adjustment of the set-screw 34 through the arm 32' permits the arms 29' of the frame or bracket 29 to be adjusted vertically or to be freed so that they may be reciprocated in the guide slots 25ᵈ of the brackets 25. When the screws 34 are tightened against the bottom of the coöperating oven M or N, the frame or bracket 29 is held from movement by the leverage exerted upon the arms 29' thereof (Fig. 6).

The table 28 is rectangular in formation, and is rigidly secured as heretofore described to the frame or bracket 29 in the plane of the bottoms of the ovens M and N. Alined with the oven N, which is the heating or drying oven, a hot plate 35 is set in the table 28, said hot plate being carried by an auxiliary plate 36, which surrounds the hot plate and carries the same. The plate 36 is provided with hangers 37 formed from a bead 38 (Fig. 4) depending from the edges of the plate 36. Set screws 39 pierce the horizontal portions of the hangers 37 and support the hot plate 35 in such manner that the same may be adjusted vertically to properly aline the same with the plane of the plate 36. These hangers 37 are disposed upon each side of the plate 36 and consequently entirely support the hot plate 35. As will be seen from Fig. 4, the dishes D may be heated upon the hot plate and slid, after an evaporation of the contents thereof, into the drying oven N without raising them from the table 28, or without any undue handling.

The end frame sections A and B are identical, and the apparatus secured thereto and carried thereby is likewise identical, except as to the hot plate 35ª carried by the end section B, which is approximately the size of the auxiliary or carrying plate 36, which coöperates with the hot plate 35 of the end section A. This is due to the fact that under usual conditions the hot plate 35ª supports and operates upon more dishes D than does the hot plate 35. Otherwise the structures are identical in all particulars.

The chambers and ovens M and N, and M' and N' are constructed, in so far as the casings are concerned, identically, and hence a description of one will suffice for all. It will be noted that the ovens N and N', as well as the chambers M and M' are identical as to their construction in the details thereof, and hence a description of the mechanism of one will suffice for both. These ovens and chambers comprise a metallic casing 40, rectangular cross-sectionally and longitudinally, except as to the forward or entrance end thereof, which is obliquely arranged to the horizontal plane, as clearly illustrated in Fig. 4. The rear end of the oven or chambers is provided with a transverse shoulder 41, adjacent to but spaced from the bottom of said casing, the shoulder being formed from the end. On each side of the casing and adjacent to the forward or entrance end thereof is a stud or projection 42, which is of a height equal to the height of the shoulder 41. The entrance end of the casing is obliquely arranged to the horizontal plane, that is to say the bottom of the casing extends beyond the top and the ends of the sides slope obliquely from the top to the bottom. The entire entrance end of the casing is surrounded by a bead 43, the plane of which coincides with the plane of the entrance end. A bushing 44 is medially formed from the top of the casing 40 adjacent to the forward edge thereof and carries a guide rod 45, which extends in a plane parallel to the entrance end aforesaid. A door 46 is arranged to slide over the entrance end of the casing 40 by means of a bracket 47 centrally carried by the upper edge of the door and provided with an extension 48 which is orificed to receive the rod 45. It is clear that gravity normally maintains the door 46 projected over the entrance end of the casing 40, while the same may be raised to reciprocate relative to the rod 45 to open the entrance end of said casing, a knob 49 being provided for this purpose. In the above particulars the ovens and chambers M N and M' N' are identical.

The heating or drying ovens N and N' each carry a hot plate 50 on the shoulder 41 and the projections or studs 42 thereof, said hot plate constituting what may be termed a secondary or false bottom for the oven, and rests in the plane of the table 28. By a consideration of Fig. 4, it will be clear that the door 46, when closed occupies a space between the forward or entrance end of the casing 40 and the table 28, and to reduce this space to a minimum, in order that the dishes D may be slid thereacross from the table 28 to the hot plate 50, a directing plate 51 is mounted on the supports 52 on the interior of the casing 40, and is sustained by said studs in a plane with the hot plate 50 and table 28. Hence a dish D may be readily slid over the space between the directing plate 51 and the table 28, by reason of the fact that this space, due to the provision of the directing plate 51, is approximately only the thickness of the door 46.

The interior mechanism of the chambers M and M' are identical, and differ only from the ovens N and N' in that a cooling plate, maintained at the temperature of the surrounding atmosphere, is provided in lieu of the hot plate 50. Inasmuch as the cooling chambers M, M' constitute the subject matter of a separate application, filed simultaneously herewith, it is thought unnecessary to here describe the details of construction thereof, other than to say that after the dishes are removed from the heating or drying ovens N N' they are immediately placed within the cooling chambers M, M', and are by their contact with the cooling plates of said cooling ovens brought to the temperature of the surrounding atmosphere. It would, however, be well to describe that the cooling or circulation plates 70 of the cooling chambers M, M' are maintained constantly at the temperature of the surrounding atmosphere by means of the coils 53, which surround all of the rear uprights 17 of both sections A and B, said coils being intercommunicating by means of a pipe 54, these coils constituting a continuous pipe wound about the rear uprights 17 of the end sections A and B, through which fluid constantly flows, the flow of fluid through the coils bringing the temperature of the fluid to the temperature of the atmosphere surrounding the entire apparatus. The fluid is conducted to the circulation plates of the cooling chambers M or M' by means of the connections described in detail in the co-pending and simultaneously filed application heretofore referred to.

Mounted on the table 21 of the medial section C of the frame is a secondary table 55, upon which is mounted the chemical balance O, which is of any desirable and suitable construction and formation. Inasmuch as this balance O is located between the two end sections A and B of the frame and set back from the tables 28, it becomes manifest that the operator may occupy a position between the tables 28, directly in front of the chemical balance O, and perform the various steps of the processes or tests with the apparatus carried by either of the end sections A or B, and be in a position to readily weigh them under constant conditions. By this construction, the speed with which the test can be carried out may be greatly increased as well as the maintenance of constant conditions under which the tests are performed. To increase this efficiency to a maximum, a plurality of switches S are provided along the forward edge of the table 21, one switch being provided to control the hot plate 35 of the end section A; one switch to control the hot plate 50 within the oven N of the end section A; one switch to control each of the similar elements mounted on the end section B; and an additional switch for controlling the blower and vacuum pump to be described.

Each end section A and B carries two rheostats R of any suitable construction, which are attached to the rear uprights 17 of such end sections above the coils 53 thereof. These rheostats control the current flow to and from the hot plates, so that the temperature maintained in the various hot plates may be readily regulated. After the rheostats R have been adjusted, it is merely necessary to operate the switches S to place the apparatus in condition for carrying out the tests and maintain the proper temperature for accomplishing these tests. The details of these rheostats form no part of the present invention, and consequently are not described in detail.

It is often essential to maintain the chambers M, M' and ovens N, N' under a vacuum and for this purpose a vacuum pump 56 is provided which is connected by a pipe 57 to the pressure indicator 58, after which it is connected to the horizontal pipe 59, which is provided with the suitable stop cocks 60, whereby the exhausting action of the vacuum pump may be regulated with respect to the individual chambers M, M' or ovens N, N'. This horizontal pipe 59 is connected by the auxiliary pipes 61 conveniently communicating with the ovens aforesaid by means of the extension pipes 62, which enter the ovens through the bottom thereof, where they exhaust the air and necessarily all of the moisture which may be within said ovens and chambers. A motor 63 operates the vacuum pump 56 as well as the exhaust fan 64, the utility of which will become apparent. It is seen from the foregoing that the stop cocks 60 are positioned in close proximity with respect to the switches S, and may be operated to put any one of said ovens under a vacuum whenever desired. The horizontal pipe 59 is connected by the individual leads 61 to each oven, as heretofore described, and each lead is provided with one of the stop cocks 60, whereby any one of them or all of them may be placed under a vacuum.

Inasmuch as volatile chemicals are used in carrying out the steps of the various tests, particularly ether and alcohol, it is particularly desirable that these vapors or gases be withdrawn, and for this purpose a hood 65, shown in dotted lines, is mounted over each table 28, and by its position collects the fumes, gases and vapors. To exhaust these, the exhaust fan 64 is provided and is connected by the pipes 66 to the under side of each table 28. These pipes terminate in the bushings 67 surrounding the openings 68 in the tables 28, adjacent to the hot plates 35, 35ª. These openings 68 are covered by the gratings 69, which, while they permit the gases to pass through, also support the dishes and prevent any dish from consequently dropping through the opening.

In order to further determine the temperatures of the various hot plates, the ovens N and N' have the thermometers 70 pierce the top thereof, said thermometers being set in the holders 71, located upon the hot plate 50, within the ovens N and N', so that the temperature of the interior of the oven may be readily determined at a glance. Similar thermometers 70ª are located upon the hot plates 35 and 35ª and indicate the heat generated within said hot plates. Usual and necessary electrical connections are provided, which it is deemed unnecessary to describe at this time, because such connections are well known in the electrical art, the novelty hereof being in the arrangement, construction and function of the apparatus itself, the same being merely aided by the rheostats R, switches S and the connections between the same.

It is thought that the foregoing description makes clear the utility and functions of the present invention. The apparatus carried by the end section A is designed for performing a "total solids test," while the apparatus carried by the end section B is designed for the performance of a "fat test." It is manifest that all of the steps of the various tests may be accomplished by this compact, efficient apparatus, without the operator or chemist leaving his position in front of the balance O, it being possible for him to conduct any number of tests simultaneously, either of total solids or fats, or both, performing all of the steps without changing his position.

What is claimed is:

1. The combination with a table having an opening therein, of a hot plate coöperating with said table adjacent to said opening, an exhaust mechanism, and a connection between said exhausting mechanism and the opening aforesaid.

2. The combination with a table having an opening therein, of a hot plate coöperating with said table adjacent to said opening, an exhaust mechanism, a connection between said mechanism and said opening, and a hood coöperating with said table.

3. The combination with a series of base frames of connections therebetween, leveling means on said base frames, and uprights secured thereto.

4. The combination with a series of independent base frames, each comprising a plurality of bars merging at their ends in feet, connections between said frames, and uprights extending therefrom.

5. The combination with a series of base frames, each comprising a plurality of horizontal bars merging at their ends to form feet, a frame connecting said base frames, sockets carried by the bars and connecting frame aforesaid and uprights mounted in said sockets.

6. In a laboratory apparatus, the combination with a plurality of uprights, of a supporting device coöperating with each upright, and tables provided with orificed portions for the reception of said uprights whereby said tables rest upon said supporting devices.

7. In a laboratory apparatus, the combination with a plurality of uprights arranged in groups, of a table coöperating with each group of uprights, and a medial table extending from one group of uprights to another group, and being supported by the uprights of both groups.

8. In a laboratory apparatus, the combination with a plurality of uprights arranged in groups, a supporting device coöperating with each upright, a table for each group of uprights coöperating with the supporting devices aforesaid, and a medial or central table extending from one group of uprights to the other group of uprights, and coöperating with and supported by the supporting devices of the uprights with which it coöperates.

9. In a laboratory apparatus, the combination with a plurality of uprights arranged in groups, of a supporting device upon each upright, and a table extending from one group of uprights to the other group of uprights provided with orificed extensions adapted to receive said uprights and rest upon the supporting devices of said uprights with which it coöperates.

10. In a laboratory apparatus, the combination with a plurality of uprights arranged in groups, of a supporting device on each upright, a table extending from one group of uprights to the other group, and orificed extensions on said table for the reception of a portion of the uprights of each group, said extensions adapted to rest upon the supporting devices of the uprights with which they coöperate.

11. In a laboratory apparatus, the combination with a plurality of uprights arranged in groups, of a supporting device on each upright, and a table individual to each group of uprights.

12. In a laboratory apparatus, the combination with a plurality of uprights arranged in groups, of a supporting device on each upright, and a table individual to each group of uprights provided with collars for the reception of said uprights.

13. In a laboratory apparatus, the combination with a plurality of uprights arranged in groups, of a supporting device on each upright, and a table individual to each group of uprights provided with collars for the reception of said uprights, said collars resting on the supporting devices of a portion of the uprights of said group, and upon the collars coöperating with the remaining uprights of said group.

14. In a laboratory apparatus, the combination with a plurality of uprights arranged in groups, of a table carried by each group of uprights, a medial table extending from one group of uprights to the other and supported by a number of the uprights of each group, and apparatus supported by the medial table for direct coöperation with the apparatus of the remaining tables.

15. In a laboratory apparatus, the combination with a supporting structure, of casings carried thereby, a table carried by said supporting structure in front of said casing, and means whereby the casings and said table occupy a common plane.

16. In a laboratory apparatus, the combination with a supporting structure, of chambers carried thereby, said chambers being provided with an internal supporting apparatus, of a table carried by said supporting structure and located in front of said chambers, said table and supporting apparatus of said chambers resting in the same plane.

17. In a laboratory apparatus, the combination with a supporting structure, of a table carried thereby, chambers carried by said table, each chamber being provided with an internal supporting apparatus, a second table coöperating with said supporting structure and occupying the same plane as the supporting apparatus of said chambers.

18. In a laboratory apparatus, the combination with a supporting structure, of a plurality of guide brackets carried thereby, U-frame mounted for reciprocation relative to said brackets, and a table carried by said frame.

19. In a laboratory apparatus, the combination with a supporting structure, of guide brackets carried along one side thereof, a U-frame, the arms of which pass through said guide brackets and extend toward the opposite side of said structure, and a table carried by and superposed above said U-frame.

20. In a laboratory apparatus, the combination with a supporting structure, of guide brackets carried along one side thereof, a U-frame, the arms of which pass through said guide brackets and extend toward the opposite side of said structure, means of adjustment and support coöperating with the free ends of the arms of said U-frame, and a table carried by said U-frame.

21. In a laboratory apparatus, the combination with a supporting structure, of guide brackets carried along one side thereof, a U-frame, the arms of which pass through said guide brackets and extend toward the opposite side of said structure, means of adjustment and support coöperating with the free ends of the arms of said U-frame, and a table carried by said U-frame, and superposed above said frame.

22. The combination with a supporting structure, of a plurality of guide brackets carried thereby, arms mounted for movement in said bracket, and bolts coöperating with the free ends of said arms for supporting and adjusting the same.

JULIUS JOHN MOJONNIER.